US 6,580,578 B1

(12) United States Patent
Tucker et al.

(10) Patent No.: US 6,580,578 B1
(45) Date of Patent: Jun. 17, 2003

(54) METHOD AND APPARATUS FOR PRESENTING BOTH SIDES OF A MEDIA TO A READ/WRITE HEAD IN A STORAGE DEVICE

(75) Inventors: Matthew Tucker, Lafayette, CO (US); Bryan D. Penner, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/481,896

(22) Filed: Jan. 12, 2000

(51) Int. Cl.[7] ............................................. G11B 15/48
(52) U.S. Cl. ...................... 360/74.2; 360/71; 360/74.1; 360/95; 242/335
(58) Field of Search .................... 360/71, 74.1, 95, 360/74.2; 242/332.7, 332.8, 348, 335, 336

(56) References Cited

U.S. PATENT DOCUMENTS

| 4,945,436 A | 7/1990 | Nagashima ................. 360/104 |
| 5,293,285 A | 3/1994 | Leonhardt et al. ............ 360/95 |
| 5,557,484 A | * 9/1996 | Leonhardt et al. ............ 360/95 |

* cited by examiner

Primary Examiner—David Hudspeth
Assistant Examiner—Dan I. Davidson
(74) Attorney, Agent, or Firm—Carstens, Yee & Cahoon (57) ABSTRACT

A method and apparatus in a data storage system for accessing a tape storage media, wherein the tape storage media has a first side and a second side for storing data. The tape storage media is received at a reel. The reel is rotatable in a first direction and in a second direction, and the reel is positioned proximate to a head used to access the tape storage media as the tape storage media is wound onto the reel. The reel is selectively rotated in the first direction and the second direction to selectively present the first side and the second side for access by the head.

44 Claims, 6 Drawing Sheets

METHOD AND APPARATUS FOR PRESENTING BOTH SIDES OF A MEDIA TO A READ/WRITE HEAD IN A STORAGE DEVICE

BACKGROUND OF THE INVENTION

1. Technical Field

The present invention relates generally to an improved data processing system and in particular to a method and apparatus for handling storage media in a data processing system. Still more particularly, the present invention provides a method and apparatus for handling magnetic media in the form of a tape in a storage system.

2. Description of Related Art

One issue faced by the data processing industry is how to store the maximum amount of data on a minimum volume of media. Magnetic recording tape is commonly used as the media of choice because it is inexpensive and yet it provides significant data storage capacity per unit volume. Improvements in magnetic recording technology have increased the track density as well as the bit recording density for magnetic tape. These improvements have been used to maximize the number of bits stored per square inch of magnetic tape. Further improvements in the recording density of magnetic tape are increasingly difficult to attain because of the need for accurate alignments of the magnetic tape with the read/write head to read the data from the tracks written on the magnetic tape. Any misalignments of the tracks of the magnetic tape with the read/write head causes errors in the data read from the magnetic tape. In addition, the increase in linear recording density is restricted by the bandwidth of the recording channel.

One approach to increasing the amounts of data that may be stored on magnetic tape is to use a two-sided magnetic tape. On a two-sided magnetic tape, data is written on both sides of the tape. These types of systems, however, require two sets of read/write heads, with one set of read/write heads being located on each of the two sides of the magnetic tape as it travels through the tape path and the tape drive. These types of systems require specially designed tape drives. These tape drive systems are complex because they require the use of two sets of read/write heads to read and write both sides of the tape as it travels through the system. The increased number of components also increases the cost of creating such tape drive systems.

Therefore, it would be advantageous to have an improved method and apparatus for reading both sides of a media using a single set of read/write heads.

SUMMARY OF THE INVENTION

The present invention provides a method and apparatus in a data storage system for accessing a tape storage media wherein the tape storage media has a first side and a second side for storing data. The tape storage media is received at a reel. The reel is rotatable in a first direction and in a second direction, and the reel is positioned proximate to a head used to access the tape storage media as the tape storage media is wound onto the reel. The reel is selectively rotated in the first direction and the second direction to selectively present the first side and the second side for access by the head.

In the depicted examples, the reel includes an inner reel and an outer reel. The outer reel is rotatable in a first direction and in a second direction to selectively present one side of the tape to the head. The inner reel is rotatable to draw additional portions of the presented side of the tape on the outer reel past the head.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
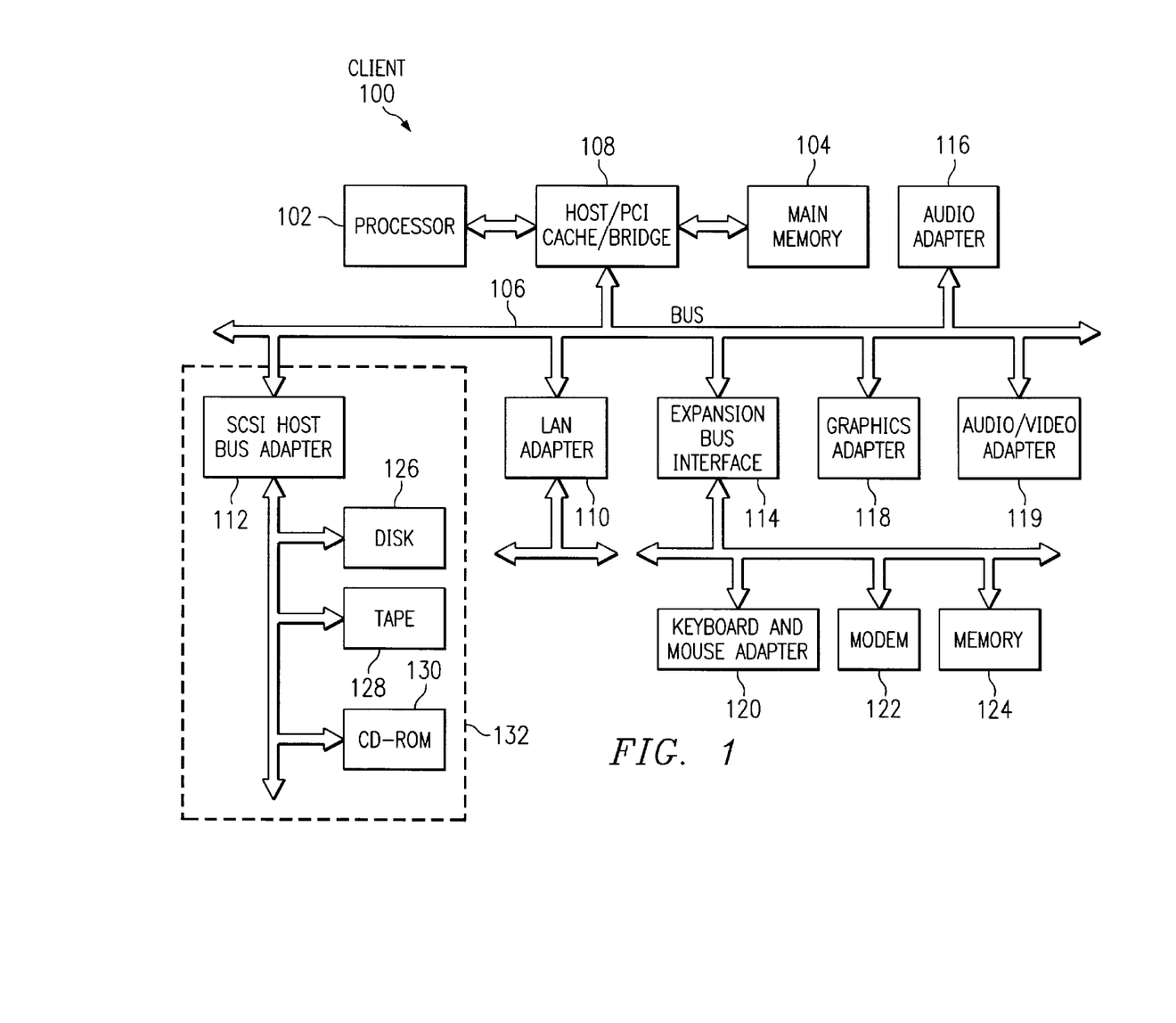
FIG. 1 is a block diagram illustrating a data processing system in which the present invention may be implemented.

With reference now to the figures and in particular with reference to FIG. 1, a block diagram illustrating a data processing system in which the present invention may be implemented. Data processing system 200 is an example of a computer in which the method and apparatus of the present invention may be located.

Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local Expansion bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors. Specifically, the method and apparatus of the present invention may be implemented within tape drive 128. In particular, the present invention provides a mechanism in which a rotatable reel within tape drive 128 is configured to receive media in the form of a tape. This tape is two sided and may hold data on either or both sides. The reel is rotatable such that either side of the tape may be presented or exposed to a head, such as a read/write head. In addition, the mechanism of the present invention may be implemented within a stand alone tape drive system instead of within a data processing system.

In this manner, the present invention allows for both sides of a tape to be presented or accessed by a single head. Thus, the present invention provides a variable media path architecture in which both sides of the media are presented to a read/write head, doubling the capacity of the media without requiring a second set of read/write heads. The present invention employs a reel in the form of a wrap ring in which both sides of the media are presented by rotating the wrap ring clockwise for one side of the media and counter clockwise for the other side of the media. The wrap ring is located proximate to the read/write head and presents the tape to the head as the tape is being wound onto the wrap ring. Thus, the present invention allows a single magnetic head assembly to write to both sides of the media.

The depicted example in FIG. 1 and above-described examples are not meant to imply architectural limitations. Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 2.

Figure 2A:
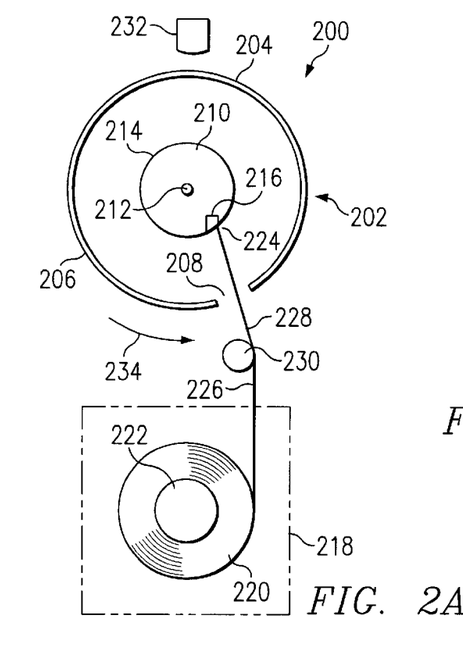
FIGS. 2A–2F are diagrams illustrating the presentation of both sides of a media to a read/write head in accordance with a preferred embodiment of the present invention.
Figure 2B:
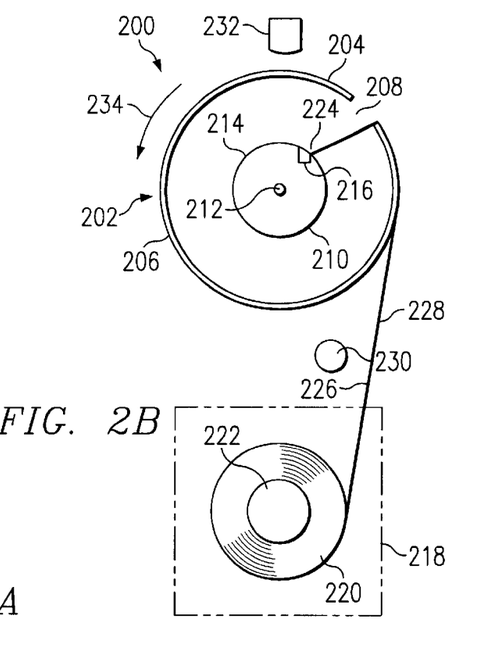
Figure 2C:
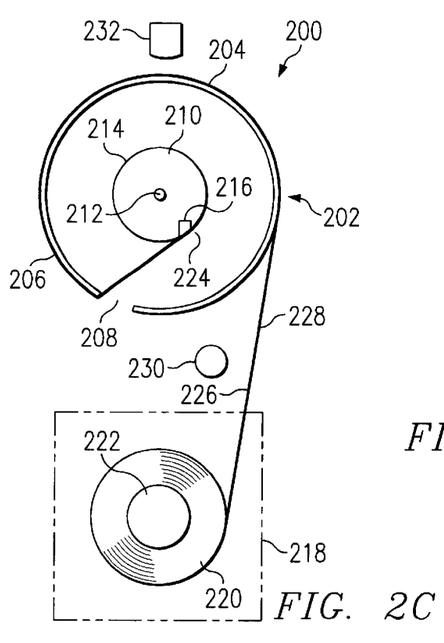
Figure 2D:
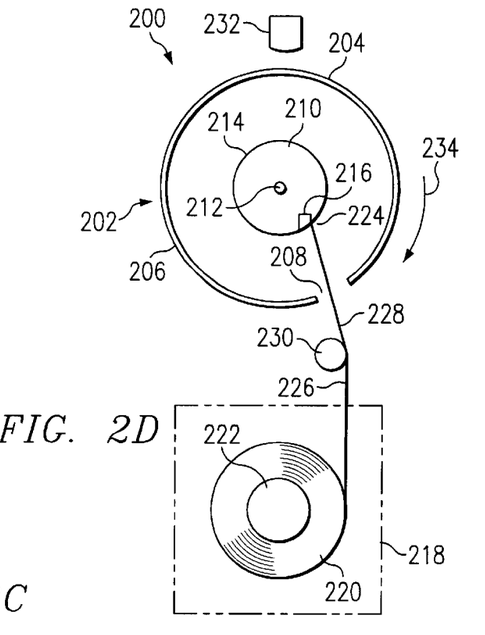
Figures 2E, 2F:
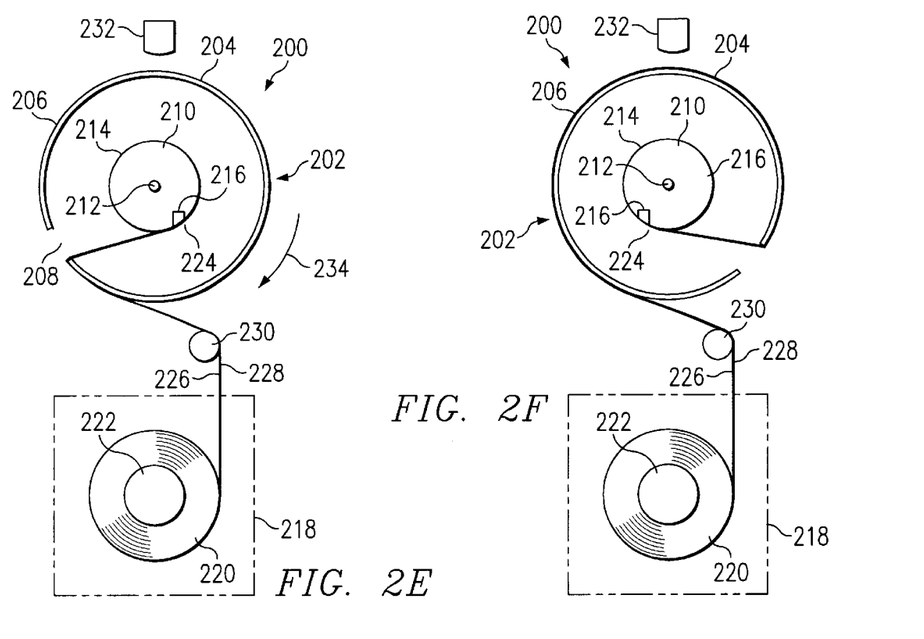

With reference next to FIGS. 2A–2F, diagrams illustrating the presentation of both sides of a media to a read/write head are depicted in accordance with a preferred embodiment of the present invention. FIGS. 2A–2C illustrate the presentation of one side of the media, while FIGS. 2D–2F illustrate the presentation of the opposite side of the media to the read/write head.

In this example, tape storage system 200 includes a reel 202. Reel 202 includes a wrap ring 204 having an outer surface 206 and a gap 208. Reel 202 also includes an inner reel 210 in the form of a cylinder, which is located within wrap ring 204. Inner reel 210 and wrap ring 204 are located centrally around point 212. Inner reel 210 has a surface 214 and a slot 216. Wrap ring 204 may rotate or turn independently from inner reel 210.

Cartridge 218, in this example, contains magnetic media in the form of magnetic tape 220, which is wound on a single reel 222, which is rotatably mounted within cartridge 218. One end of magnetic tape 220 may be threaded through gap 208 and secured to inner reel 210. A leader block 224 at the end of magnetic tape 220 may be engaged within slot 216 in inner reel 210 of reel 202. Magnetic tape 220 has a first side 226 and a second side 228 on which data is written. Cartridge 218 may be implemented using the cartridge disclosed in U.S. Pat. No. 5,293,285, which is incorporated herein by reference.

Bearing 230 serves as a guide to magnetic tape 220. Head 232 is used to read and write data on magnetic tape 220. Head 232 is positioned proximate to wrap ring 204. Head 232 accesses one side of magnetic tape 220 as it is wound on-wrap ring 204 of reel 202.

In FIGS. 2A–2C, reel 202 is rotated in a counterclockwise fashion as indicated by arrow 234. As can be seen, magnetic tape 220 is wrapped around outer surface 206 of wrap ring 204 presenting second side 228 to head 232. In this example, second side 228 is the outer side of magnetic tape 220. In FIG. 2A, the tape is shown in an unwrapped initial position with reel 202 in a position for receiving leader block 224. In FIG. 2B, wrap ring 204 rotates counter clockwise to wrap magnetic tape 220 onto outer surface 206 of wrap ring 204. In these examples, wrap ring 204 rotates about 270 degrees to wrap magnetic tape 220 around wrap ring 204. Of course other degrees of rotation may be used, such as, for example 400 degrees. Thereafter, in this example, wrap ring 204 is locked in place and inner reel 210 pulls magnetic tape 220 across wrap ring 204 and winds magnetic tape 220 within inner reel 210. Wrap ring 204 may rotate or turn independently from inner reel 210. In this example, inner reel 210 also rotates with wrap ring 204. Depending on the implementation, inner reel 210 may stay in a non-rotating position, while wrap ring 204 rotates to present second side 228 to head 232.

In FIG. 2C, second side 228 is presented to head 232 as magnetic tape 220 is wound onto wrap ring 204 of reel 202. Head 232, at this time, may read or write data onto second side 228. After second side 228 has been presented to head 232, wrap ring 204 is locked into position, while inner reel 210 within reel 202 continues to rotate to advance second side 228 of magnetic tape 220 around wrap ring 204 past head 232.

In FIGS. 2D–2F, reel 202 is rotated in a clockwise fashion as illustrated by arrow 234. In this case, first side 226, also referred to as the inner side of magnetic tape 220, is presented to head 232. In FIG. 2D, an unwrapped initial position is illustrated. In this position, magnetic tape 220 has been fed into reel 202 with leader block 224 being received in slot 216 of inner reel 210. In FIG. 2E, wrap ring 204 begins to wrap magnetic tape onto outer surface 206 of wrap ring 204. In FIG. 2F, wrap ring 204 has rotated such that first side 226 is presented or exposed to head 232. After first side 226 has been presented to head 232, as illustrated in FIG. 2F, inner reel 210 will rotate to draw magnetic tape 220 from cartridge 218 around wrap ring 204 past head 232. Head 232, at this time, may read or write data onto first side 226. Thus, depending on the direction of which wrap ring 204 is rotated, different sides of magnetic tape 220 are presented to head 232.

In this manner, both sides of the media may be presented to a read/write head. As a result, a single head assembly, such as head 232 may be used to write both sides of magnetic tape 220. This advantage is provided through the use of reel 202 containing an inner reel 210 and a wrap ring 204 in which the wrap ring rotates to present one side of magnetic tape 220 to head 232 and inner reel 210 rotates to draw tape from cartridge 218 around wrap ring 204 past head 232. Thus, the storage capacity of the magnetic tape in a cartridge, such as cartridge 218 may be doubled. This mechanism requires only a minimal number of software and mechanical changes to enable the drive to read and write on both sides of a double-sided tape cartridge. In particular, several processes are modified to determine which side of the media is to be read and to control the motor rotating wrap ring 204 appropriately in addition to rotating the inner reel 210 to draw magnetic tape 220 from cartridge 218. Mechanical changes involve using a wrap ring, such as wrap ring 204 in addition to inner reel 210, as well as appropriate location of bearings, such as bearing 230 used to guide magnetic tape 220.

Figure 3A:
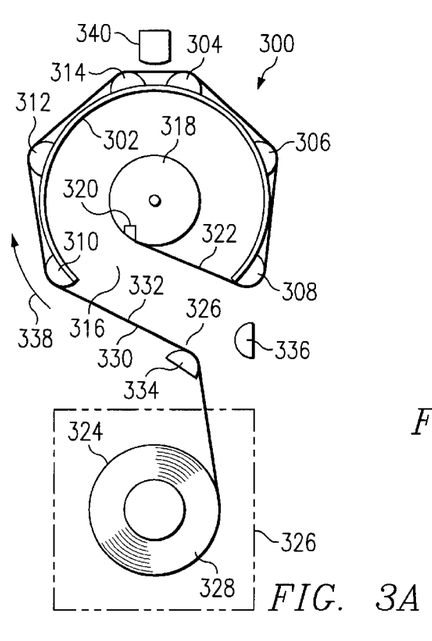
FIGS. 3A–3B are diagrams of an alternate configuration for a wrap ring in accordance with a preferred embodiment of the present invention.
Figure 3B:
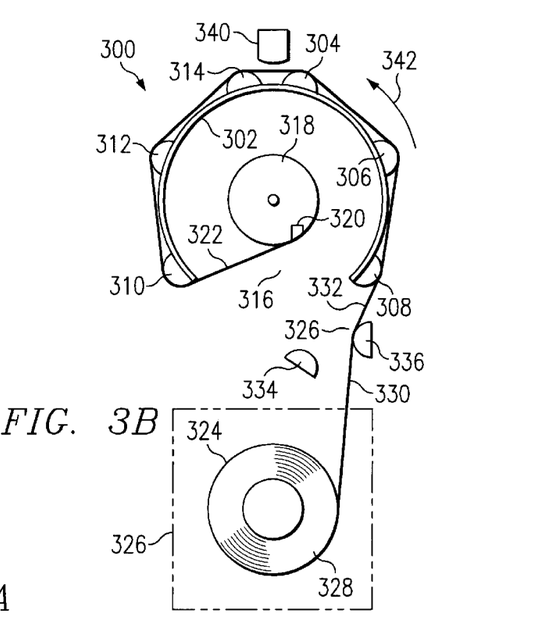

With reference to FIGS. 3A–3B, are diagrams of an alternate configuration for a wrap ring is depicted in accordance with a preferred embodiment of the present invention. In this example, reel 300 is similar to reel 202 in FIGS. 2A–2F. In this example, however, wrap ring 302 is formed by D bearings 304–314. Again, gap 316 is present within wrap ring 302 of reel 300. An inner reel 318 containing a slot 320 to receive a block leader 322 at the leading end of magnetic tape 324 as illustrated. Magnetic tape 324 is housed within cartridge 326 of round reel 328. As in the previous examples, magnetic tape includes a first side 330 and a second side 332.

In this example, instead of using a single bearing, such as bearing 230 in FIG. 2, a set of D bearings 334 and 336 are employed. These D bearings are used to guide the tape as it is wrapped around reel 300. In this example, when reel 300 is rotated in a clockwise fashion, as illustrated by arrow 338 in FIG. 3A, first side 330 is presented to head 340. This side is also referred to as the inner side. In FIG. 3B, when wrap ring 300 is rotated in a counter clockwise manner, as illustrated by arrow 342, second side 332 of magnetic tape 324 is presented to head 340 for reading and/or writing. In this example, D bearings 334 and 336 are used to guide magnetic tape 324. When second side 332 of magnetic tape 324 is presented to head 340, magnetic tape 324 is guided by D bearing 336. When first side 330 of magnetic tape 324 is presented to head 340, D bearing 334 guides magnetic tape 324.

Figure 4:
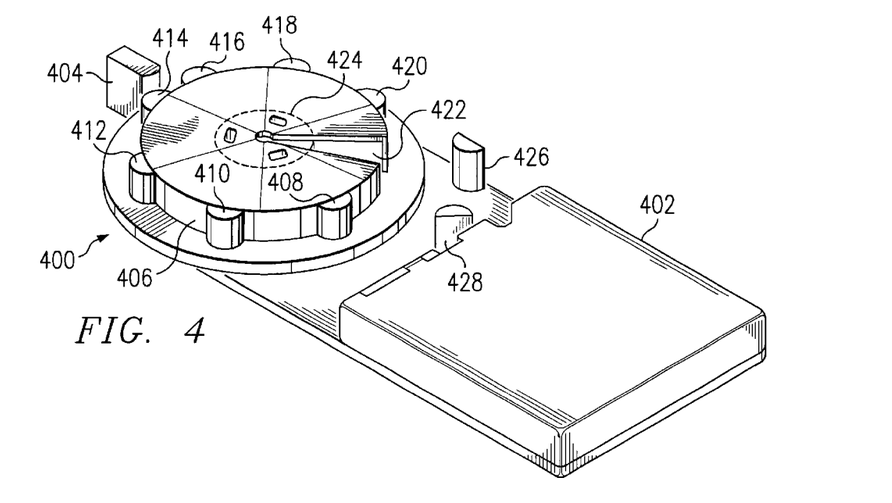
FIG. 4 is a diagram illustrating a wrap ring in accordance with a preferred embodiment of the present invention.

With reference next to FIG. 4, a diagram illustrating a wrap ring is depicted in accordance with a preferred embodiment of the present invention. FIG. 4 is a perspective diagram of a reel 400, such as reel 300 in FIGS. 3A and 3B, and a cartridge 402, such as cartridge 326 in FIGS. 3A and 3B. Additionally, a head 404, such as head 340 in FIGS. 3A and 3B, is illustrated in FIG. 4. As can be seen, reel 400 includes a wrap ring 406 in which wrap ring 406 contains D bearings 408–420. Further, an inner reel 422 is found within reel 400 as indicated by dotted lines 424 in the unexposed sections. As described in FIGS. 3A and 3B, D bearings 426 and 428 are used to guide a tape from cartridge 402 into a slot or other securing mechanism within inner reel 422. After one end of a tape is secured to inner reel 422, wrap ring 406 selectively rotates in one direction or the other to expose a first side or a second side of a tape for presentation to head 404. The other side of the tape faces the outer surface of wrap ring 406. Next, inner reel 422 will rotate to wind tape onto wrap ring 406 past head 404 from cartridge 402. Inner reel 422 is independently rotatable from wrap ring 406. Inner reel 422 is in the form of a cylinder in this example, but other shapes may be used depending on the implementation.

The illustration of the different forms of the reel of the present invention in FIGS. 2A–2F, FIGS. 3A–3C, and FIG. 4 are not meant to imply architectural limitations on the shape or size of the components for a reel, such as reel 202, reel 300, and reel 400. For example, other numbers of bearings, other than the six illustrated in reel 300, and bearings of other shapes, other than the D shapes used in reel 300, may be used. Additionally, wrap ring 406 may be constructed from a number of different materials. For example, wrap ring 406 may be made from a metal, such as, for example, aluminum, magnesium, or steel. Further, other materials, such as polymers and ceramic materials may be used to form wrap ring 406. It is also contemplated that a mixture of material may be used to construct wrap ring 406. In this example, the material selected for wrap ring 406 is aluminum or any other material that provides high dimensional stability for locating or placing D bearings 408–420.

Figure 5:
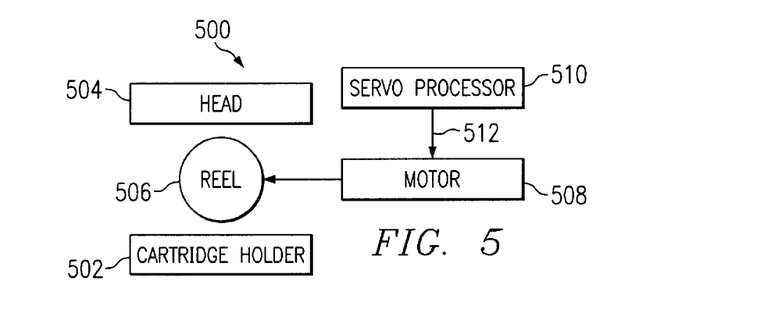
FIG. 5 is a block diagram of components used to present both sides of a media to a read/write head in accordance with the preferred embodiments of the present invention.

With reference to FIG. 5, a block diagram of components used to present both sides of a media to a read/write head is depicted in accordance with the preferred embodiment of the present invention. Tape drive system 500 includes a cartridge holder 502, which is designed to receive a cartridge, such as cartridge 218 in FIGS. 2A–2F, for presentation to a read/write head 504. In this example, reel 506 includes a wrap ring and an inner reel, such as wrap ring 204 and inner reel 210 in FIGS. 2A–2F. Reel 506 is controlled by motor unit 508. Motor unit 508 is capable of turning the wrap ring and inner reel of reel 506 in both a clockwise and counter clockwise direction. These components of reel 506 are described in more detail above with reference to FIGS. 2A–2F, FIGS. 3A–3C, and FIG. 4.

The speed of motor unit 508 and the direction of motor unit 508 is controlled by servo processor 510, which is in communication with motor unit 508 through line 512, which provides an electrical path to motor unit 508 to control the movement of reel 506.

In these examples, reel 506 is a wrap ring such as wrap ring 204 in FIGS. 2A–2F and an inner reel, such as inner reel 210 in FIGS. 2A–2F. Of course, any type of reel configuration that allows for rotation or presentation of both sides of a tape to the same read/write head may be used in accordance with a preferred embodiment of the present invention. Motor unit 510 may include two motors in which one motor is attached to the inner reel to draw tape from a source, while a second motor is coupled to the wrap ring to wrap the tape. In the depicted example, the second motor would be outside of the ring and coupled to the wrap ring via a gear.

Servo processor 510 includes instructions used for generating the necessary control signals to selectively control the rotation of reel 506 through motor unit 508 to present the appropriate side of a tape to head 504.

The components illustrated in FIG. 5 are not meant to imply architectural limitations to a storage system in which the present invention may be used. The other components necessary for the reading and/or writing of a magnetic tape also may be included within tape drive system 500.

Figure 6:
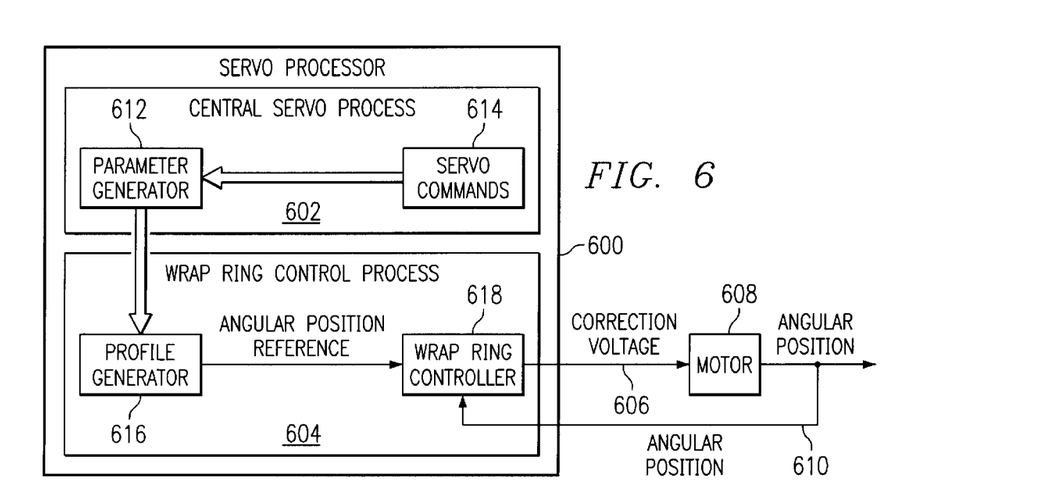
FIG. 6 is a block diagram illustrating processes used to control a wrap ring in accordance with a preferred embodiment of the present invention.

With reference to FIG. 6, a block diagram illustrating processes used to control a wrap ring is depicted in accordance with a preferred embodiment of the present invention. In this example, a servo processor 600 contains a central servo process 602 and a wrap ring control process 604. These processes generate the appropriate correction voltages along control line 606 to motor unit 608. Further, these processes also may be used to control the uptake of magnetic tape by a reel in addition to controlling the wrap ring.

In this example, motor unit 608 is used to rotate the wrap ring, but also may include a unit to rotate the inner reel or cylinder within the wrap ring. Motor unit 608 may be implemented as motor unit 508 in FIG. 5. In addition, angular position information is returned along data line 610 to wrap ring control process 604.

In these examples, servo processor 600 may take many forms. For example, servo processor 600 may be a digital signal processor, an application specific integrated circuit system, or some other analog circuit system.

Central servo process 602 includes a parameter generator 612, which receives servo commands 614. Parameter generator 612 computes profile parameters, such as the direction of the wrap ring, the total time for wrap ring movement, and the total distance that the wrap ring should move. The parameters are generated in response to receiving servo commands 614. Servo commands that may be received by parameter generator 612 may include, for example, a command to wrap the tape clockwise and a command to wrap the tape counter clockwise. This parameter information is passed to profile generator 616 in wrap ring control process 604. Wrap ring control process 604 may also control the inner reel around which the tape is wound in addition to the wrap ring itself. Alternatively, the control of the inner reel and the cartridge reel motors may be through a separate process. In such an implementation, a different control process in a different controller controls the velocity of the reels and the tension of the tape between the reels.

Profile generator 616 generates angular position reference information sent to wrap ring controller 618. With angular position reference information from profile generator 616 and angular position information returned from motor unit 608, wrap ring controller 618 generates an appropriate correction voltage to control motor unit 608. This angular position information may be obtained from a quadrature encoder for motor unit 608. A quadrature encoder may be used to measure the angular position and direction of the motor. Angular position is the number of degrees or radians that the wrap ring actually turns and is a measured value in this example. Angular position reference is the desired angular position of the wrap ring. A set of angular position reference points verses time are generated to accomplish the maneuver of wrapping the tape. Wrap ring controller 618 moves the wrap ring in a stable and robust fashion to follow the requested trajectory.

Depending on the correction voltage, motor 608 may turn clockwise or counter clockwise. Further, the correction voltage also may control the speed at which motor unit 608 turns the wrap ring and the inner reel. Alternatively, motor unit 608 may have the speed of the inner reel controlled by a separate process.

Figure 7A:
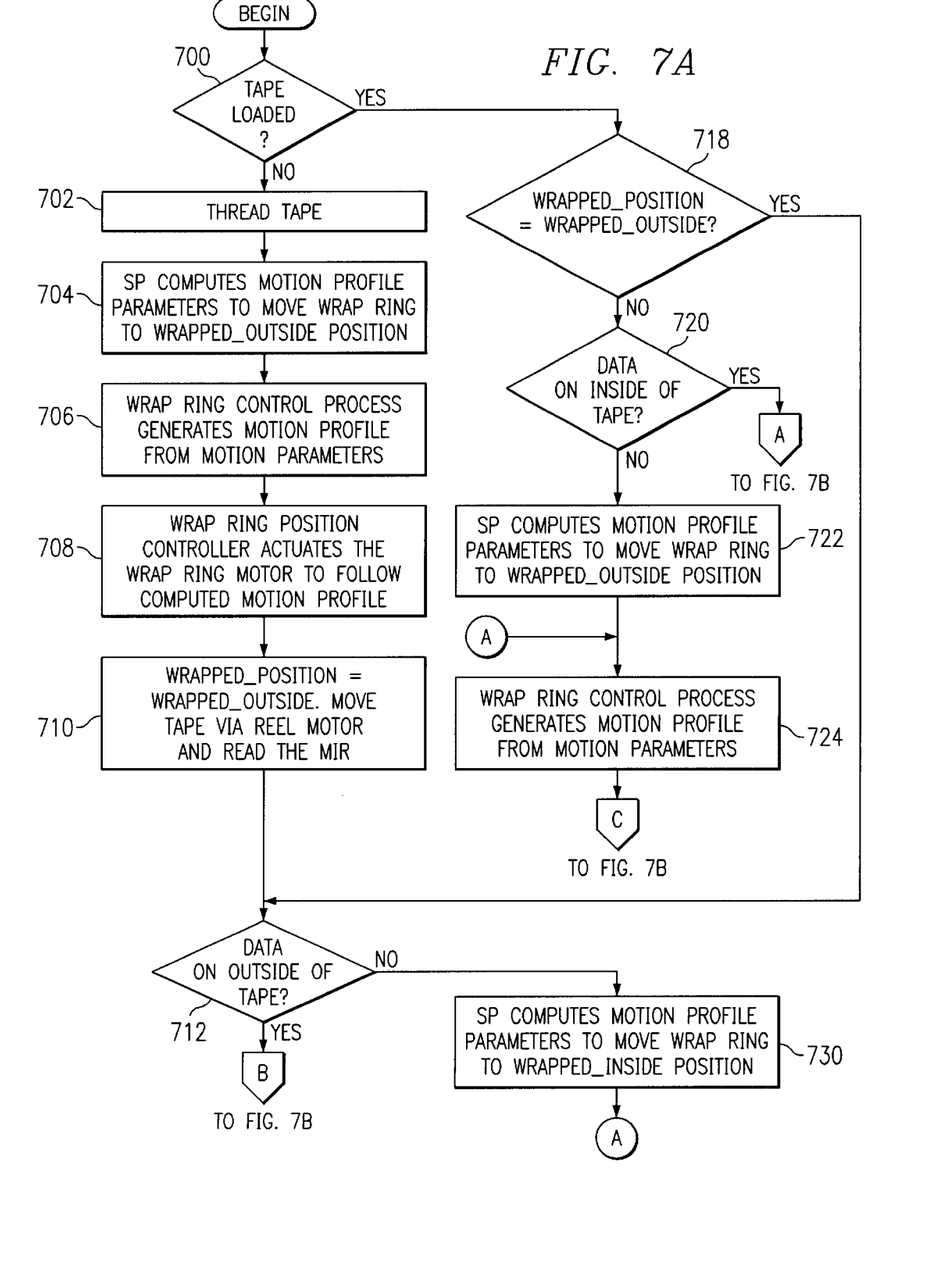
FIG. 7 is a flowchart of a process used for data retrieval using a double-sided media in accordance with a preferred embodiment of the present invention.
Figure 7B:
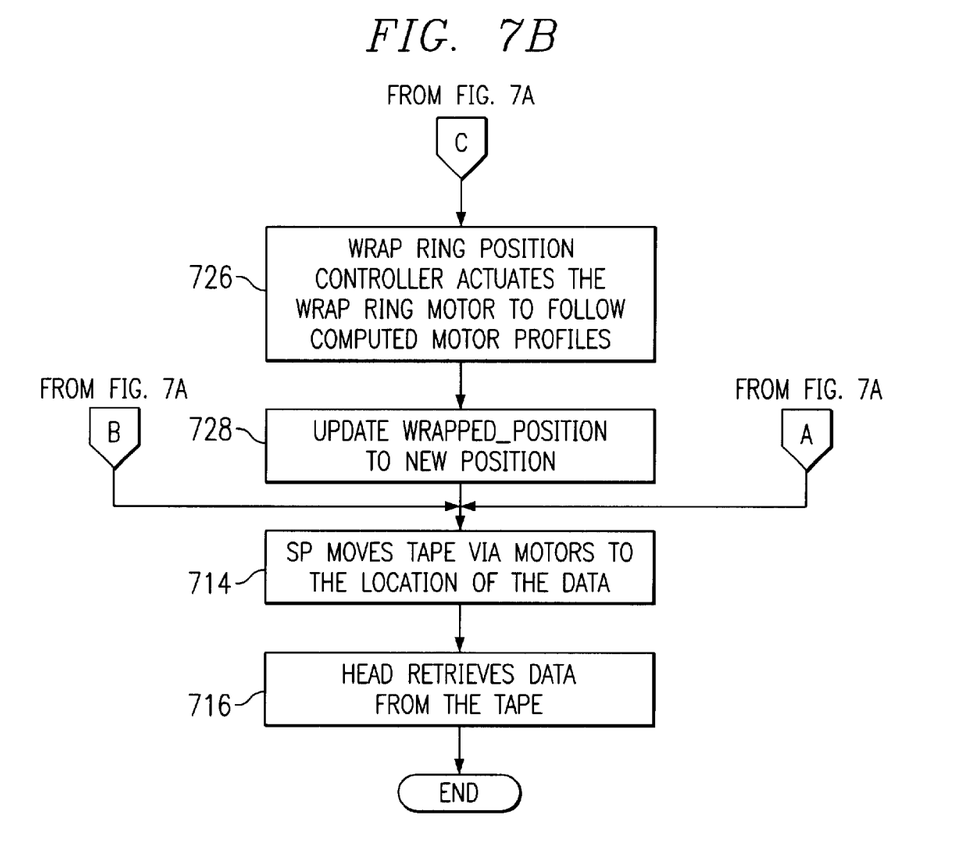

With reference to FIG. 7, a flowchart of a process used for data retrieval using a double-sided media is depicted in accordance with a preferred embodiment of the present invention. The process begins by determining whether a tape is loaded on the wrap ring in the tape system (step 700). If a tape is not loaded, the tape is then threaded onto the wrap ring (step 702). Next, the servo processor (SP) computes motion profile parameters used to move the wrap ring to the WRAPPED_OUTSIDE position (step 704). The WRAPPED_OUTSIDE position is a wrap ring position in which the outside of the tape is presented to the head. Wrap ring control process generates a motion profile from motion profile parameters (step 706). Next, a wrap ring controller actuates the wrap ring motor to follow the computed motion profile (step 708). In this example, the wrap ring controller is a wrap ring controller, such as wrap ring controller 618 in FIG. 6. Next, WRAPPED_POSITION is set equal to WRAPPED_OUTSIDE, and the tape is moved via reel motors and the media information record (MIR) is read (step 710). WRAPPED_POSITION is the wrap ring position.

A determination is then made as to whether the data is on the outside of the tape (step 712). If the data is on the outside of the tape, the servo processor moves the tape via the motors to the location of the data (step 714). In step 714, the motor unit is instructed to turn an inner reel to draw tape from the source, such that the tape moves around the wrap ring to the appropriate location for access by the head. Thereafter, the head retrieves the data from the tape (step 716) with the process terminating thereafter.

With reference again to step 700, if the tape is loaded on the wrap ring, a determination is made as to whether WRAPPED_POSITION is equal to WRAPPED_OUTSIDE (step 718). WRAPPED_OUTSIDE is a wrap ring position in which the outside of the tape is presented to the head. If the WRAPPED_POSITION is such that the outside of the tape is presented to the head, the process then proceeds to (step 712) as described above. Otherwise, a determination is made as to whether the data desired is on the inside of the tape (step 720). If the data is on the inside of the tape, the process then proceeds (step 714) as described above. Otherwise, the servo processor computes motion profile parameters to move the wrap ring to WRAPPED_OUTSIDE position (step 722). In both cases, the wrap ring controlled process generates a motion profile from the motion parameters (step 724). The wrap ring controller actuates the wrap ring motor to follow the computed motor profile (step 726). The WRAPPED_POSITION is updated to a new position (step 728) with the process then proceeding to step 714 as described above.

With reference again to (step 712), if the data is not on the outside of the tape, then the service processor computes motion profile parameters to move the wrap ring to a WRAPPED_INSIDE position (step 730) with the process then proceeding to step 724 as described above.

The writing of data to a two-sided tape may be performed using a similar flow to that illustrated in FIG. 7. The wrap ring may be rotated in one direction to write data to one side of the tape and then rewound and wrapped in the other direction to write data to the other side of the tape.

Thus, the present invention provides an improved method, apparatus, and instructions for accessing data on both sides of the media using a single read/write head system. The present invention provides an architecture, which multiple read/write systems are not necessary to read and write data from both sides of a media. Of course, although the depicted examples are illustrated with respect to read/write heads, these processes also may be applied to read heads and write heads. In addition, although the media illustrated is magnetic media, these processes may be applied for any type of media that includes data that is written on two sides of a tape. The present invention provides a mechanism in which a minimal number of software and mechanical changes are needed to enable a drive to read and write both sides of a double sided cartridge. For example, the present invention may be applied to optical media.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. For example, although the wrap ring is illustrated in a C shape, other shapes may be used that accomplish the same result of selectively exposing or presenting the first side or the second side of a tape to a head. For example, the wrap ring may be configured in many different symmetric configurations, such as a trapezoid or a square. If D bearings are being used, the bearings should be spaced such that at least two D bearings are positioned close together to provide sufficient tape to head contact for reading and writing operations. Also, the inner reel is shown in the form a cylinder, but may take different shapes in which these reels function to move tape from the source around the wrap ring past the head.

Further, the mechanism of the present invention may allow for rotating or moving the wrap ring without having to rewind the magnetic tape already on the reel to switch sides of the tape presented to the head. In this manner, the opposite side of a tape may be presented for access by a head without having to rewind the tape. This mechanism merely requires the wrap ring to be rotated in the opposite direction to switch sides of the tape being exposed or presented for access by the head.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data storage system for accessing a tape storage media, wherein the tape storage media has a first side and a second side for storing data, the method comprising:
    receiving the tape storage media at a reel, wherein the reel is rotatable in a first direction and in a second direction and wherein the reel is positioned proximate to a head used to access the tape storage media as the tape storage media is wound onto the reel; and
    selectively rotating the reel in the first direction and the second direction to selectively present the first side and the second side for access by the head.

2. The method of claim 1, wherein the tape storage media is a magnetic tape.

3. The method of claim 1, wherein the tape storage media is an optical tape.

4. The method of claim 1, wherein the tape storage media has a first end received at the reel and wherein the reel comprises:
    an inner cylinder configured to receive the first end of the tape storage media; and
    an outer ring around which the tape storage media is wound, wherein rotation of the reel in the first direction exposes a first portion of the first side on the reel to the head and wherein rotation of the reel in the second direction exposes a second portion of the second side on the reel to the head.

5. The method of claim 4, wherein the head is a read/write head.

6. A method for accessing data on a tape, wherein the data is located on a first side and a second side of the tape, the method comprising:
    receiving the tape at a wrap ring;
    rotating the wrap ring in a first direction to present a first portion of the first side of the tape to a head; and
    rotating the wrap wring in a second direction to present a second portion of the second side of the tape to the head, wherein the head is located proximate to the wrap ring such that the first portion and the second portion are portions of the tape wound onto the wrap ring.

7. The method of claim 6, wherein the wrap ring has a C shape.

8. The method of claim 6, wherein the tape is a magnetic tape.

9. The method of claim 6, wherein the tape is an optical tape.

10. The method of claim 6, wherein the tape is also received by a reel located within the wrap ring and further comprising:
    rotating the reel to present additional portions of the tape to the head on a side presented to the head.

11. The method of claim 6, wherein the wrap ring comprises a plurality of D shaped bearings.

12. A method in a data storage system for accessing a tape storage media, wherein the tape storage media has a first side and a second side for storing data, the method comprising:
    moving a first end of a tape from a source, through an outer reel, and to an inner reel located within the outer reel;
    rotating the outer reel in one of a first direction and a second direction, wherein one of the first side and the second side of the tape is exposed on an outer ring to form an exposed side of the tape such that a head is able to access the exposed side of the tape; and
    rotating the inner reel to move portions of the exposed side past the head.

13. The method of claim 12, wherein the tape storage media is a magnetic tape.

14. The method of claim 12, wherein the tape storage media is an optical tape.

15. The method of claim 12, wherein the outer reel is a wrap ring.

16. The method of claim 12, wherein the outer reel is comprised of a plurality of bearings.

17. The method of claim 12 further comprising:
    securing the first end of the tape to the inner reel prior to rotating the outer reel and the inner reel.

18. A tape drive comprising:
    a reel, wherein the reel is configured to receive a tape from a source, wherein the tape has a first side and a second side;
    a tape path configured to guide a tape from the source to the reel;
    a motor connected to the reel, wherein the motor rotates the reel in a first direction and a second direction;
    a head unit for accessing the tape, wherein the head unit is located proximate to the reel such that the head accesses an exposed portion of the tape on the reel; and
    a control unit connected to the motor, wherein the control unit sends a first signal to the motor to rotate the reel in the first direction to expose a portion of the tape on the first side to the head unit and sends a second signal to the motor to rotate the reel in the second direction to expose a portion of the tape of the second side of the tape.

19. The tape drive of claim 18, wherein the tape is a magnetic tape.

20. The tape drive of claim 18, wherein the tape is an optical tape.

21. The tape drive of claim 18, wherein the head unit is a single read/write head.

22. The tape drive of claim 18, wherein the control unit is a digital signal processor.

23. The tape drive of claim 18, wherein the tape path includes a bearing.

24. The tape drive of claim 18, wherein the reel comprises:
    an inner member configured to receive a first end of the tape from the source, wherein the inner member is rotatable to draw the tape from the source past the head; and an outer member configured to present one side of the tape to the head in response to a rotation of the outer member, wherein the inner member is located within the outer member and wherein the outer member is independently rotatable from the inner member.

25. The tape drive of claim 24, wherein the inner member is a cylinder and wherein the outer member is a wrap ring.

26. A reel for use in a tape drive system, the reel comprising:

an outer ring, wherein the outer ring is configured to wrap at least a portion of a tape around an outer surface of the outer ring such that placement of a head proximate to the outer ring presents one of a first side and a second side of the tape to the head in response to a rotation of the outer ring in one of a first direction and a second direction; and an inner cylinder located within the outer ring, wherein the inner cylinder has a recess configured to receive one end of the tape and wherein rotation of the inner cylinder draws portions of the tape wrapped around the outer surface of the outer ring past the head.

27. A data storage system for accessing a tape storage media, wherein the tape storage media has a first side and a second side for storing data, the data storage system comprising:

receiving means for receiving the tape storage media at a reel, wherein the reel is rotatable in a first direction and in a second direction and wherein the reel is positioned proximate to a head used to access the tape storage media as the tape storage media is wound onto the reel; and rotating means for selectively rotating the reel in the first direction and the second direction to selectively present the first side and the second side for access by the head.

28. The data storage system of claim 27, wherein tape storage media is a magnetic tape.

29. The data storage system of claim 27, wherein the tape storage media is an optical tape.

30. The data storage system of claim 27, wherein the tape storage media has a first end received at the reel comprises:

an inner cylinder configured to receive the first end of the tape storage media; and an outer ring around which the tape storage media is wound, wherein rotation of the reel in the first direction exposes a first portion of the first side on the reel to the head and wherein rotation of the reel in the second direction exposes a second portion of the second side on the reel to the head.

31. The data storage system of claim 30, wherein the head is a read/write head.

32. A data storage system for accessing data on a tape, wherein the data is located on a first side and a second side of the tape, the data storage system comprising:

receiving means for receiving the tape at a wrap ring;

first rotating means for rotating the wrap ring in a first direction to present a first portion of the first side of the tape to a head; and second rotating means for rotating the wrap wring in a second direction to present a second portion of the second side of the tape to the head, wherein the head is located proximate to the wrap ring such that the first portion and the second portion are portions of the tape wound onto the wrap ring.

33. The data storage system of claim 32, wherein the wrap ring has a C shape.

34. The data storage system of claim 32, wherein the tape is a magnetic tape.

35. The data storage system of claim 32, wherein the tape is an optical tape.

36. A data storage system for accessing a tape storage media, wherein the tape storage media has a first side and a second side for storing data, the data storage system comprising:

moving means for moving a first end of a tape from a source, through an outer reel, and to an inner reel located within the outer reel;

first rotating means for rotating the outer reel in one of a first direction and a second direction, wherein one of the first side and the second side of the tape is exposed on an outer ring to form an exposed side of the tape such that a head is able to access the exposed side of the tape; and second rotating means for rotating the inner reel to move portions of the exposed side past the head.

37. The data storage system of claim 36, wherein the tape storage media is a magnetic tape.

38. The data storage system of claim 36, wherein the tape storage media is an optical tape.

39. The data storage system of claim 36, wherein the outer reel is a wrap ring.

40. The data storage system of claim 36, wherein the outer reel is comprised of a plurality of bearings.

41. The data storage system of claim 36 further comprising:

securing means for securing the first end of the tape to the inner reel prior to rotating the outer reel and the inner reel.

42. A computer program product in a data storage system for accessing a tape storage media, wherein the tape storage media has a first side and a second side for storing data, the computer program product comprising:

first instructions for receiving the tape storage media at a reel, wherein the reel is rotatable in a first direction and in a second direction and wherein the reel is positioned proximate to a head used to access the tape storage media as the tape storage media is wound onto the reel; and second instructions for selectively rotating the reel in the first direction and the second direction to selectively present the first side and the second side for access by the head.

43. A computer program product in a data storage system for accessing data on a tape, wherein the data is located on a first side and a second side of the tape, the computer program product comprising:

first instructions for receiving the tape at a wrap ring;

second instructions for rotating the wrap ring in a first direction to present a first portion of the first side of the tape to a head; and third instructions for rotating the wrap wring in a second direction to present a second portion of the second side of the tape to the head, wherein the head is located proximate to the wrap ring such that the first portion and the second portion are portions of the tape wound onto the wrap ring.

44. A computer program product in a computer readable medium for accessing a tape storage media in a data storage system, wherein the tape storage media has a first side and a second side for storing data, the computer program product comprising:

first instructions for moving a first end of a tape from a source, through an outer reel and to an inner reel located within the outer reel;

second instructions for rotating an outer reel in one of a first direction and a second direction, wherein one of a first side and a second side of the tape is exposed on the outer ring to form an exposed side of the tape such that a head is able to access exposed side of the tape; and third instructions for rotating the inner reel to move portions of the exposed side past the head.

* * * * *